(12) United States Patent
Das Sharma (10) Patent No.: US 9,965,439 B2
(45) Date of Patent: May 8, 2018

(54) LOW LATENCY MULTI-PROTOCOL RETIMERS

(71) Applicant: Intel Corporation, Santa Clara, CA (US)

(72) Inventor: Debendra Das Sharma, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 135 days.

(21) Appl. No.: 15/193,941

(22) Filed: Jun. 27, 2016

(65) Prior Publication Data

US 2017/0371831 A1    Dec. 28, 2017

(51) Int. Cl.
*G06F 13/42* (2006.01)
*G06F 15/16* (2006.01)
*G06F 13/40* (2006.01)

(52) U.S. Cl.
CPC ...... *G06F 13/4291* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 7,092,999 B2 * | 8/2006 | Levitan | ................. | H04H 20/86 375/E7.024 |
| 7,363,395 B2 | 4/2008 | Seto | | |
| 8,680,969 B2 * | 3/2014 | Ackmann | .......... | H05B 37/0254 340/5.1 |
| 2005/0073961 A1 * | 4/2005 | Paik | ........................ | H04L 43/50 370/252 |
| 2007/0025388 A1 * | 2/2007 | Abhishek | ................ | H04L 1/188 370/447 |
| 2010/0121969 A1 * | 5/2010 | Levitan | ................... | H04L 45/38 709/231 |
| 2015/0261718 A1 | 9/2015 | Campbell et al. | | |
| 2015/0295679 A1 | 10/2015 | Valliappan | | |
| 2016/0182257 A1 | 6/2016 | Froelich et al. | | |

FOREIGN PATENT DOCUMENTS

WO    2015099733    7/2015

OTHER PUBLICATIONS

PCT Application No. PCT/US2017/030605, International Search Report and the Written Opinion, dated Jul. 28, 2017, 10 pgs.

* cited by examiner

*Primary Examiner* — Hyun Nam
(74) *Attorney, Agent, or Firm* — Womble Bond Dickinson (US) LLP (57) ABSTRACT

A multi-protocol retimer apparatus and method for using the same are disclosed. In one embodiment, an apparatus for performing retiming between first and second devices according to a plurality of protocols comprises: a receiver operable to receive data; a transmitter to transmit data; a first data path coupled to the receiver and the transmitter and operable to transfer data received from the receiver to the transmitter during protocol specific training, where the first data path comprises control circuitry to control protocol specific training of one or both of the transmitter and receiver in response to an indication of one protocol of the plurality of protocols; and a second data path coupled to the receiver and the transmitter, the second data path having a lower latency than the first data path and for use in transferring data received from the receiver to the transmitter after protocol specific training.

30 Claims, 6 Drawing Sheets

(a: Link without Retimer)

FIG. 1A (b: Link with one Retimer)

LOW LATENCY MULTI-PROTOCOL RETIMERS

FIELD OF THE INVENTION

Embodiments of the present invention relate to the field of interfaces for computer systems; more particularly, embodiments of the present invention relate to retimers that can be configured to transfer data according to multiple protocols.

BACKGROUND OF THE INVENTION

As the frequency of external interfaces in computer systems increases and the channel improvement continues to be modest while maintaining back-ward compatibility, the need to use retimers in interfaces has increased. For example, Peripheral Component Interface Express (PCIe) Generation 4, in which the interface operates at 16.0 GT/s, will need a retimer for most server channels which are typically 20" FR4 with two connectors. Universal Serial Bus (USB) Version 3.1 operates at 10 GT/s and already needs a retimer for most platforms. Other interfaces needs some form of extension device for some of platforms that operate at 10.4 GT/s.

There are multiple challenges with each of these interfaces. For cache-coherency protocols such as Ultra Path Interconnect (UPI), an additional latency of about 30 nsec per retimer hop makes it untenable due to the unacceptable performance loss. Latency is already an issue even with PCIe for some memory applications and is expected to become more serious as the next-generation non-volatile memory (NVM) technologies provide higher bandwidth and lower latency, closing the gap with double data rate synchronous dynamic random-access memory (DDR SDRAM). An analog re-driver does not have the latency issue. However, since it does not participate in the link initialization and equalization phase, the analog re-driver fails to recreate the transmitter equalization space, unlike the re-timers, and hence will have limited use, especially with open slots/connectors type systems.

A second challenge is multiple protocol support through different physical layers (PHYs) as there are in a Type-C connector. Having a separate retimer with a physical multiplexer to separate between the different PHYs may be a possible solution, but is expensive and can take up valuable board real-estate along with increased power.

A third challenge is the number of different retimers have to be supported in certain platforms and the associated validation and impose inter-operability challenges.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A multi-protocol capable retimer and method for using the same are disclosed. In one embodiment, a link, such as a PCIe-compliant link, can include one or more such retimers or other extension devices. The retimer includes active electronic elements that receive and re-transmit (retime) digital signals.

In one embodiment, the multi-protocol retimer includes two data paths for each sub-link. The first data path is a low-latency bypass path for normal traffic. In one embodiment, this first data path is used when operating in a common clock mode. The second data path has a longer latency than the first data path. In one embodiment, this second path is used when in non-common clock mode or while training (e.g., link training and/or initialization). This is typically when the latency is not critical.

In one embodiment, the multi-protocol aware retimer employs a common data path along with a converged Link Training and Status State Machine (LTSSM) that is essential for initialization and link training for multiple protocols for which the retimer may be configured. In one embodiment, the LTSSM identifies the protocol running on the link initially from the Data Rate as well as the bit patterns. In one embodiment, this information can be presented through a side-band mechanism such as, for example, a strap, or Joint Test Action Group (JTAG), or System Management Bus (SMBUS). In one embodiment, the training comprises a link equalization procedure, such as the link equalization procedure of PCIe. In one embodiment, the retimer includes a bypass path for low-latency use after any required link training (e.g., an equalization process for generating transmitter and/or receiver equalization parameters (e.g., coefficients)) has been performed.

In one embodiment, the retimer is able to switch between the two paths. In one embodiment, protocol enhancements during training ensure that the retimer can switch back and forth between these two data paths. These protocol enhancements are described in more detail below.

In one embodiment, the multi-protocol aware retimer employs circuits to determine the PHY, or protocol, being used for data transfer. In one embodiment, the circuits are coupled to receive a strap option or some other sideband mechanism that indicates the PHY. In another embodiment, the determination of the PHY is done by detecting a training set modification to a training set used for link training.

The retimer described herein has low latency and can be used across multiple interconnects. This is a significant improvement over separate retimers for separate interconnects with high latency.

Figure 1A:
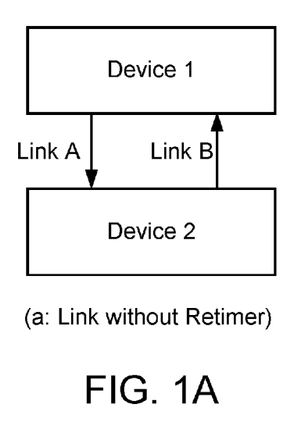
FIG. 1A illustrates a link without a retimer.
Figure 1B:
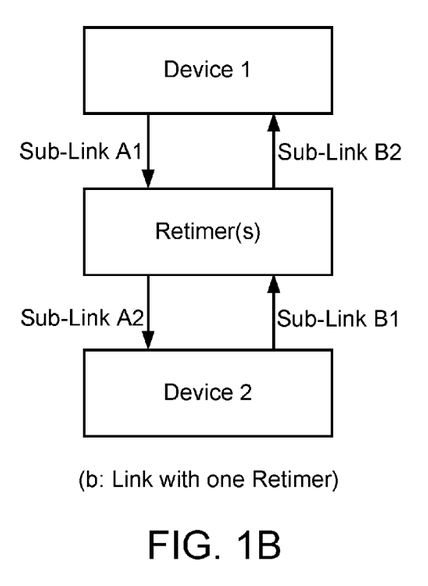
FIG. 1B illustrates a link with one or more retimers.
Figure 1C:
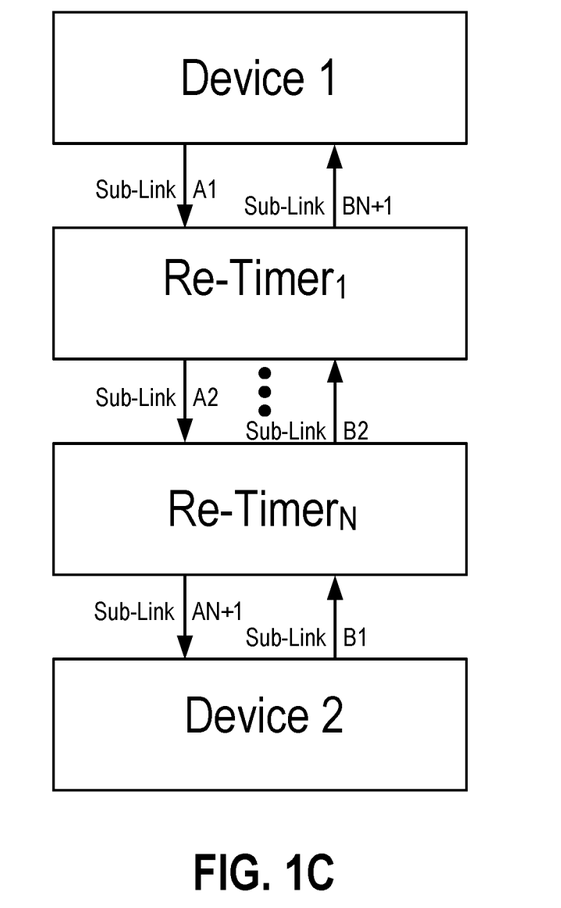
FIG. 1C illustrates another element of a link with multiple retimers.

FIG. 1A illustrates a link without a retimer. Referring to FIG. 1A, Device 1 and Device 2 are coupled together via link A and link B. In contrast, FIG. 1B illustrates a link with one or more retimers. Referring to FIG. 1B, Device 1 and Device 12 are coupled to the one or more retimer(s) 101. Retimer(s) 101 may be one component for all the lanes of the link or can be multiple retimers, each handling a distinct set of lanes in the link. In one embodiment, there multiple retimers in a link, such as shown, for example, in FIG. 1C. In the case of a single retimer, retimer(s) 101 is coupled to Device 1 by sub-link A1 and sub-link B2 and coupled to Device 2 by sub-link A2 and sub-link B1. These sub-links adhere to a protocol and retimer(s) 101 is configurable to operate at that protocol (i.e., one of a plurality of protocols) to which the sub-links adhere to enable communication between Device 1 and Device 2.

Figure 2:
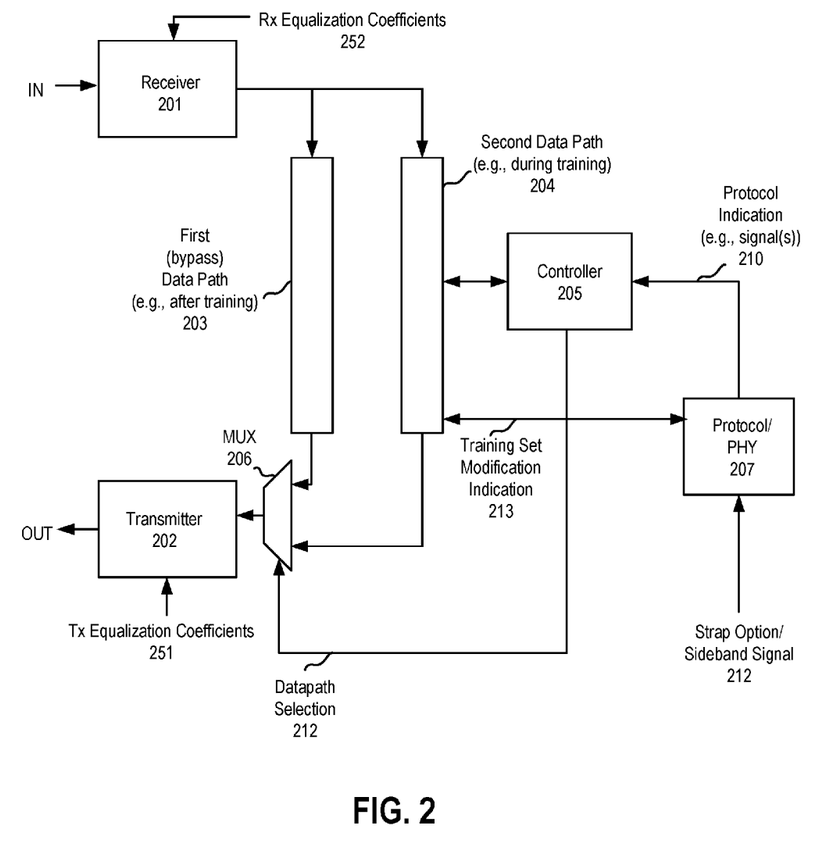
FIG. 2 is a block diagram of one embodiment of a retimer.

FIG. 2 is a block diagram of one embodiment of a retimer. In one embodiment, the retimer performs retiming between two devices and is capable of being configured to any of a plurality of protocols (one at time).

Referring to FIG. 2, a receiver 201 receives data from a first device for transfer to a second device via transmitter 202. Receiver 201 and transmitter 202 are coupled together via a first data path 203, a second data path 204, and multiplexer (mux) 206. In one embodiment, data path 204 is used to transfer data received from receiver 201 to transmitter 202 during protocol specific training (e.g., link training). The protocol specific training enables transmitter 202 and receiver 201 to transfer data between the two devices according to the protocol of the link between them. Data path 203 is used to transfer data between receiver 201 and transmitter 202 after the protocol specific training has occurred. In one embodiment, data path 203 has a lower latency than data path 204. In one embodiment, data path 203 is used during common clock mode and data path 204 is for use during non-common clock mode and during training.

In one embodiment, data path 204 is coupled to controller 205 (e.g., control circuitry). Controller 205 performs the protocol specific training of one or both of transmitter 202 and receiver 201. In one embodiment, the protocol specific training comprises link training and initialization. In one embodiment, such link training comprises performing an equalization procedure. In one embodiment, the equalization process generates transmitter equalization coefficients to control equalization performed by transmitter 202, such as, for example, cursor coefficients to determine the level of de-emphasis and preshoot. In one embodiment, the equalization process generates receiver equalization coefficients for receive-side equalization in the form of continuous time linear equalization (CTLE) and decision feedback equalization (DFE). Note that in one embodiment, when training receiver 201, data path 204 is also used.

In one embodiment, data path 204 includes one or more link training state machines for the plurality of protocols, where the one or more link training state machines are executed by controller 205 to perform link training according to the one protocol specified by protocol indication 210. In one embodiment, one state machine is able to perform training (e.g., link training) for multiple protocols. In another embodiment, there are separate state machines for each of the different protocols. In one embodiment, the link training state machines comprise a Link Training and Status State Machine (LTSSM). The state machine is stored in memory and accessed by controller 205. In one embodiment, when executing the LTSSM, controller 205 generates ordered sets (OSs) for the link training associated with each of the plurality of protocols.

In one embodiment, controller 205 is responsive to a protocol indication 210 (e.g., one or more signals) specifying one protocol (of the multiple protocols) used for transferring data between the two devices. Protocol indication 210 is provided by protocol/PHY determiner 207 (e.g., a determination circuit) that provides protocol indication 210 in response to one or more of a strap option or sideband signal 212 or an indication 213 of a training set modification, which it receives from data path 204. The training set modification is usually specified by each protocol, which has a defined training set modification specification for the retimer.

In one embodiment, a switch occurs from using data path 203 to data path 204 in response to receiving a predefined training set. In such a case, a training set modification indication 213 may come from data path 204 to protocol/PHY determiner 207, which provides protocol indication 210 to controller 205 in order to specify a new link training (e.g., equalization) procedure needs to be performed. Note that such a switch to use either data path 203 or data path 204 is implemented in part by multiplexer 206. A data path selection signal 211 from controller 205 causes either data from data path 203 or 204 to be output to transmitter 202 for transmission.

Figure 3:
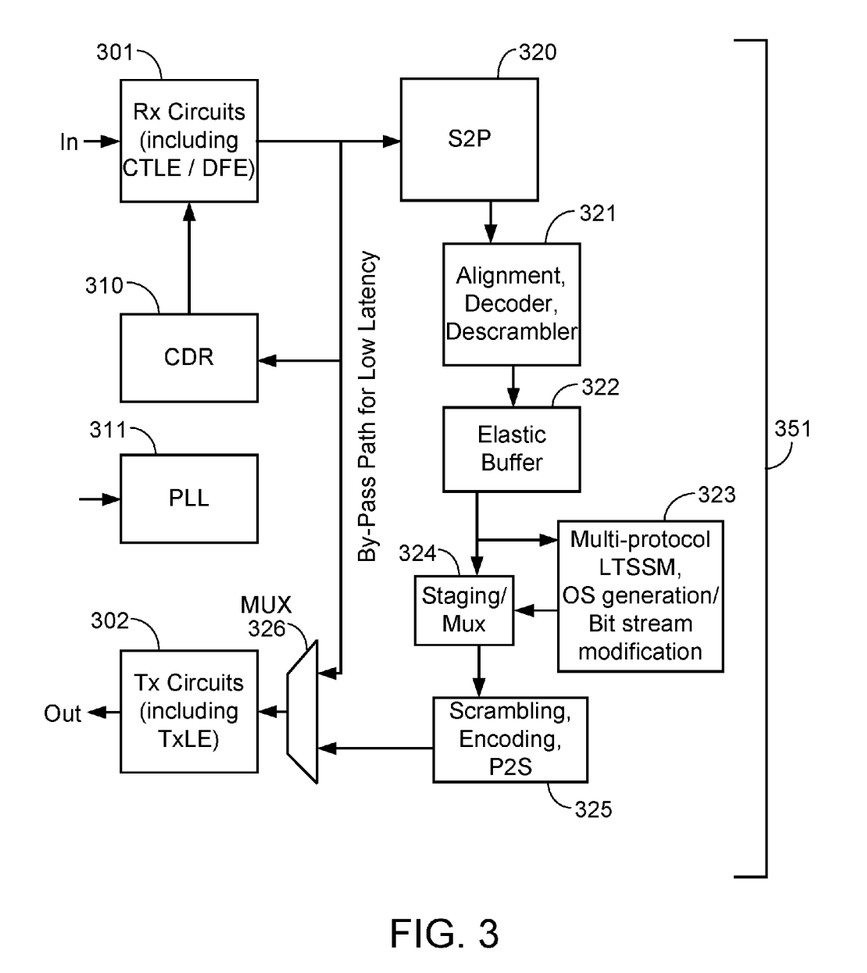
FIG. 3 is another block diagram of one embodiment of a retimer depicting a data path used for training.

FIG. 3 is another block diagram of one embodiment of a retimer depicting a data path used for training. Note that the controller and its function has not been shown in FIG. 3, as it had in FIG. 2; even so, one skilled in the art would understand the controller functions in order to implement the retimer operation described herein.

Referring to FIG. 3, the retimer includes a receiver 301 (e.g., receive circuits) and a transmitter 302 (e.g., transmit circuits). In one embodiment, receiver 301 performs a continuous time linear equalization (CTLE) or decision feedback equalization (DFE) in a manner well-known in the art. A clock and data recovery (CDR) circuit 340 is coupled to receiver 301 and operates in a manner well-known in the art.

The retimer includes two data paths between receiver 301 and transmitter 302. Both are coupled to the output of receiver 301 and to two inputs of a multiplexer (mux) 326, the output of which is coupled to an input of transmitter 302. One of the data paths, data path 351 is for use during training, while the other data path, bypass path 350, is used after training.

Data path 351 includes a number of components. Serial to Parallel (S2P) converter 320 converts data from serial to parallel. As receiver 301 operates in the analog domain, S2P converter 320 converts the received data into parallel format so that the data may be processed in digital format.

Based on the protocol associated with the data, the parallel data undergoes alignment, decoding and descrambling by data processor 301 if necessary. More specifically, the data may need to be unscrambled. This may be due to the speed at which the data is being received. The bits may have to be decoded. For example, the data may have to undergo 8 b/10 b decoding or another type of decoding. The data bits may also have to undergo alignment to determine when symbols in the stream of bits begins. These options are performed in manner well-known in the art for comprehending the various protocols supported. Note that if a protocol does not require any or all of alignment, decoding and descrambling, then such functions are not performed. The resultant data is stored in elastic buffer 322.

In one embodiment, elastic buffer 322 is a common elastic buffer that can also act as a drift buffer for protocols (such as, for example, UPI, USB, Thunderbolt, etc.) that need it. Elastic buffer 322 also compensates for bit streams that are being transmitted according to clocks of one clock domain that don't match the clocks of the clock domain to which the data is being transmitted.

The data from the elastic buffer 322 is sent to the staging buffer and multiplexer (mux) 324 and the multi-protocol training control block 323.

In one embodiment, multi-protocol training control block 323 includes a common set of link training and status state machine (LTSSM) subset needed for each protocol along with the associated bit stream detection/modification needed for each protocol. For example, if one of the protocols is PCIe, then the PCIe LTSSM is included as a subset in the common set, and the multi-protocol training control block 323 is able to perform bit stream detection, ordered set generation (that is used during link training), and bit stream modification that are associated with the PCIe Standard, which are well-known in the art. In one embodiment, multi-protocol training control block 323 includes a common set of link training and status state machine (LTSSM) subset for one or more of USB, Display Port, Thunderbolt, or coherency protocols such as, for example, UPI.

Any data output for transmission by transmitter 302 from multi-protocol training control block 323 and data from elastic buffer 322 are received by inputs of the mux of staging buffer and mux 324, which outputs either depending on the control selection (e.g., signal) received by the mux.

Finally, data output from staging buffer and mux 324 undergoes any scrambling and encoding, as dictated by the protocol being used to transfer the data, and conversion to a serial format using converter 325. The serial data is output to one input of mux 326, which provides the serial data or the data from bypass path 350 to transmitter 325.

Note that in one embodiment, the various analog control circuitry, such as, for example, those of receiver 301 and transmitter 302, can operate in all the data rates of the supported protocols A phase locked loop (PLL) or other clock generator 311 provides clock signals to the components of the retimer.

Thus, the data path 351 has a common set of processing blocks and the common circuitry above has a common set and associated control circuitry that can make the protocol and data rate related controls needed to operate to transfer data according to more than one protocol. In one embodiment, a strap or sideband signal is used by data path to determine the PHY/protocol in use. Alternately, the logic layer can look for the initial training sets and determine which PHY protocol is being used. In one embodiment, this logic layer resides in multi-protocol training control block 323.

Bypass path 350 is the second data path for use after link training. In one embodiment, bypass path 350 is for low-latency bit transmission and is enabled for regular bit-stream transmission in a common clock mode.

In one embodiment, even in the bypass mode, the logic layer in the regular path 351 monitors the traffic to determine if a bit stream needs to be modified. In one embodiment, the following mechanisms are used to transition between path 351 and bypass path 350.

In one embodiment, during link training, path 351 participates in the Tx equalization mechanism on both sides, as dictated by the corresponding PHY protocol specification. The Tx equalization setting remains for that speed in place until there is a re-equalization procedure. Note that in one embodiment, a re-equalization procedure may occur when a component detects that the equalization it did previously is not working well as determined by the error rate. In another embodiment, the re-equalization procedure may occur when software directs a link to redo equalization based on similar metrics such as error rate being above a threshold.

In one embodiment, the PHY specification uses one or more special training sets (TSs) that the Devices coupled together via the retimers described herein (or other extension devices)(e.g., Device 1 or Device 2 of FIG. 1B) sends after completing Tx Equalization to allow the retimer(s) to switch to the bypass mode in which bypass path 350 is used. When switching, the retimer(s) lose the bits that are being processed in the regular path 351. Hence, the receiving device (e.g., Device 2 of FIG. 1B) will miss a portion of the bit stream. In one embodiment, this situation is handled as follows.

The first distinct Ordered Set (OS) (referred to herein as "Regular to Bypass Marker Ordered Set") provides the instruction to the retimer(s) to switch the path from regular path 351 to bypass path 350 after transmitting the distinct Ordered Set which will also act as an indicator to the device to re-establish the Block/Symbol boundary. In one embodiment, the switchover occurs after a pre-determined time that all components follow. The retimer ensures that the latency does not exceed this pre-determined time to allow the "Regular to Bypass Marker Ordered Set" to pass through completely without being truncated or dropped.

A subsequent Ordered Set is sent some time after marker Ordered Set. In one embodiment, the elapsed time is greater than the maximum number of retimers on the path allowed by the specification (typically 2) times the pre-determined time after the retimer switches over to bypass path 350. This will be used by the receiver Device (e.g., Device 2 of FIG. 1B) to re-establish its Symbol/Block boundary after missing some bits due to the switchover.

For protocols such as PCI-Express, such an Ordered Set is not necessary since the TS1 Ordered Sets along with the EIEOS continues after equalization is performed. The device (e.g., Device 2) can simply retrain and get block alignment with a specification modification requiring the device to do so.

There will be cases (such as re-equalization) where the retimer needs to move from bypass path 350 to normal path 351. When that occurs, a part of the bit-stream will repeat. This can be done by having the same marker Ordered Set followed by training sets, similar to what is described above.

In one embodiment, when a Link needs to go to Electrical Idle, the indicator Ordered Set (e.g., Electrical Idle Ordered Set in PCIe) is sent some time before when the link really goes to Electrical Idle. Note that in PCIe the EIOS is long enough and can be identified after the first few symbols, which means there is anywhere from 20 UI to 96 UI depending on which encoding/speed before the link goes to Electrical Idle. This indicator Ordered Set is followed by some valid bit-stream that may be dropped. This allows the retimer to react to the Ordered Set (which happens in regular path 351) and take its Tx lanes to Electrical Idle. In an alternative embodiment, no changes are made and the Device side (e.g., Device 2 of FIG. 1B) is expected to re-train (which it does anyway on exit from L1) on exit from Electrical Idle.

Figure 4:
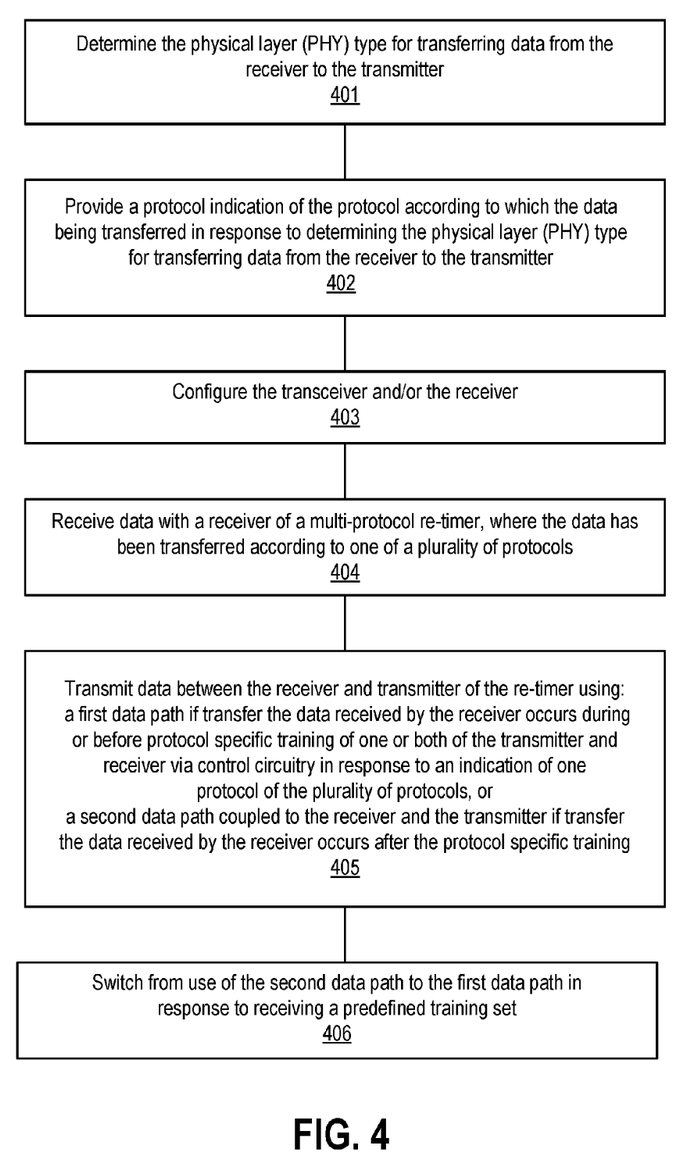
FIG. 4 is a flow diagram of one embodiment of a process for transferring data between two devices using at least one retimer.

FIG. 4 is a flow diagram of one embodiment of a process for transferring data between two devices using at least one retimer. In one embodiment, the process is performed by processing logic that may comprise hardware (circuitry, dedicated logic, etc.), software (such as is run on a general purpose computer system or a dedicated machine), firmware, or a combination of the three.

The process begins by processing logic determining the physical layer (PHY) type (e.g., PCIe, USB, Display Port, etc.) for transferring data from the receiver to the transmitter (processing block 401). In one embodiment, determining the PHY type is based on a strap option. In another embodiment, determining the PHY type is based on a sideband signal. In yet another embodiment, determining the PHY type is based on monitoring the training set for matching the PHY type.

Then, processing logic provides a protocol indication of the protocol according to which the data being transferred in response to determining the physical layer (PHY) type for transferring data from the receiver to the transmitter (processing block 402).

In response to the protocol indication, processing logic optionally configures the transceiver and/or the receiver (processing block 403). The configuring may comprise training (e.g., link training). In one embodiment, the protocol specific training includes performing an equalization process. In one embodiment, performing the equalization process comprises generating transmitter equalization coefficients to control equalization performed by the transmitter.

Subsequently, processing logic receives data with a receiver of a multi-protocol retimer, where the data has been transferred according to one of a plurality of protocols (processing block 404) and transmits data between the receiver and transmitter of the retimer using a first data path coupled to the receiver and the transmitter if transfer the data received by the receiver occurs during or before protocol specific training of one or both of the transmitter and receiver via control circuitry in response to an indication of one protocol of the plurality of protocols, or a second data path coupled to the receiver and the transmitter if transfer the data received by the receiver occurs after the protocol specific training, the second data path having a lower latency than the first data path (processing block 405).

In one embodiment, using the first data path comprises running a link training state machine to perform link training according to the one protocol specified by the indication. In one embodiment, running a link training state machine to perform link training comprises performing ordered set generation for the link training associated with one protocol.

In one embodiment, the second data path is used during common clock mode and the first data path is for use during non-common clock mode and during protocol specific training. In one embodiment, use of the first or second data path includes sending a control signal to a multiplexer having a first input coupled to the first data path and a second input coupled to the second data path to generate an output coupled to the transmitter.

At a time in the future, processing logic optionally switches from use of the second data path to the first data path in response to receiving a predefined training set (processing block 406).

Figure 5:
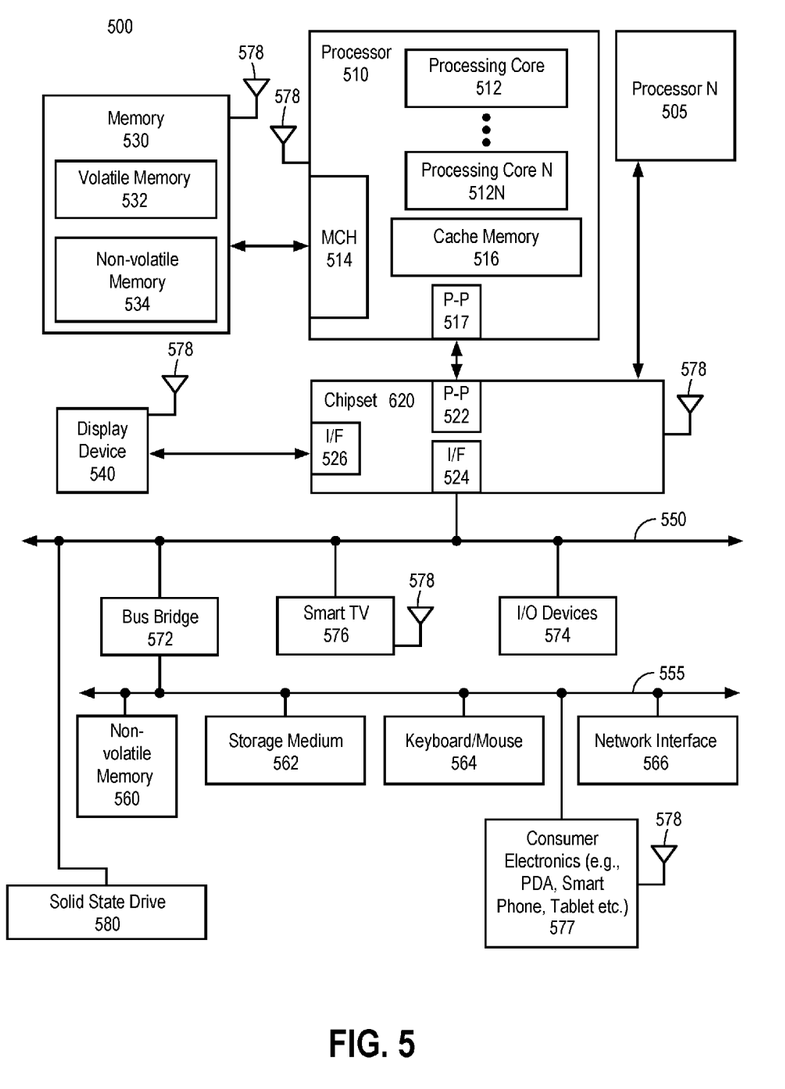
FIG. 5 illustrates one embodiment of a system level diagram.

FIG. 5 is one embodiment of a system level diagram 500 that may incorporate the techniques described above. For example, the techniques described above may be incorporated into an interconnect or interface in system 500.

Referring to FIG. 5, system 500 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 500 implements the methods disclosed herein and may be a system on a chip (SOC) system.

In one embodiment, processor 510 has one or more processor cores 512 to 512N, where 512N represents the Nth processor core inside the processor 510 where N is a positive integer. In one embodiment, system 500 includes multiple processors including processors 510 and 505, where processor 505 has logic similar or identical to logic of processor 510. In one embodiment, system 500 includes multiple processors including processors 510 and 505 such that processor 505 has logic that is completely independent from the logic of processor 510. In such an embodiment, a multi-package system 500 is a heterogeneous multi-package system because the processors 505 and 510 have different logic units. In one embodiment, processing core 512 includes, but is not limited to, pre-fetch logic to fetch instructions, decode logic to decode the instructions, execution logic to execute instructions and the like. In one embodiment, processor 510 has a cache memory 516 to cache instructions and/or data of the system 500. In another embodiment of the invention, cache memory 516 includes level one, level two and level three, cache memory, or any other configuration of the cache memory within processor 510.

In one embodiment, processor 510 includes a memory control hub (MCH) 514, which is operable to perform functions that enable processor 510 to access and communicate with a memory 530 that includes a volatile memory 532 and/or a non-volatile memory 534. In one embodiment, memory control hub (MCH) 514 is positioned outside of processor 510 as an independent integrated circuit.

In one embodiment, processor 510 is operable to communicate with memory 530 and a chipset 520. In such an embodiment, SSD 580 executes the computer-executable instructions when SSD 580 is powered up.

In one embodiment, processor 510 is also coupled to a wireless antenna 578 to communicate with any device configured to transmit and/or receive wireless signals. In one embodiment, wireless antenna interface 578 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 534 includes, but is not limited to, flash memory (e.g., NAND, NOR), phase change memory (PCM), read-only memory (ROM), electrically erasable programmable read-only memory (EEPROM), or any other type of non-volatile memory device.

Memory 530 stores information and instructions to be executed by processor 510. In one embodiment, chip set 520 connects with processor 510 via Point-to-Point (PtP or P-P) interfaces 517 and 522. In one embodiment, chipset 520 enables processor 510 to connect to other modules in the system 500. In one embodiment, interfaces 517 and 522 operate in accordance with a PtP communication protocol such as the Intel QuickPath Interconnect (QPI) or the like.

In one embodiment, chip set 520 is operable to communicate with processor 510, 505, display device 540, and other devices 572, 576, 574, 560, 562, 564, 566, 577, etc. In one embodiment, chipset 520 is also coupled to a wireless antenna 578 to communicate with any device configured to transmit and/or receive wireless signals.

In one embodiment, chip set 520 connects to a display device 540 via an interface 526. In one embodiment, display device 540 includes, but is not limited to, liquid crystal display (LCD), plasma, cathode ray tube (CRT) display, or any other form of visual display device. In addition, chipset 520 connects to one or more buses 550 and 555 that interconnect various modules 574, 560, 562, 564, and 566. In one embodiment, buses 550 and 555 may be interconnected together via a bus bridge 572 if there is a mismatch in bus speed or communication protocol. In one embodiment, chipset 520 couples with, but is not limited to, a non-volatile memory 560, a mass storage device(s) 562, a keyboard/mouse 564, and a network interface 566 via interface 524, smart TV 576, consumer electronics 577, etc.

In one embodiment, mass storage device 562 includes, but is not limited to, a solid state drive, a hard disk drive, a universal serial bus flash memory drive, or any other form of computer data storage medium. In one embodiment, network interface 566 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 5 are depicted as separate blocks within the system 500, the functions performed by some of these blocks may be integrated within a single semiconductor circuit or may be implemented using two or more separate integrated circuits.

In a first example embodiment, an apparatus for performing retiming between first and second devices according to a plurality of protocols comprises: a receiver operable to receive data; a transmitter to transmit data; a first data path coupled to the receiver and the transmitter and operable to transfer data received from the receiver to the transmitter during protocol specific training, the first data path comprising control circuitry to control protocol specific training of one or both of the transmitter and receiver in response to an indication of one protocol of the plurality of protocols; and a second data path coupled to the receiver and the transmitter, where the second data path has a lower latency than the first data path and is for use in transferring data received from the receiver to the transmitter after protocol specific training.

In another example embodiment, the subject matter of the first example embodiment can optionally include that the protocol specific training comprises performing an equalization process. In another example embodiment, the subject matter of this example embodiment can optionally include that the equalization process generates transmitter equalization coefficients to control equalization performed by the transmitter.

In another example embodiment, the subject matter of the first example embodiment can optionally include that the second data path is used during common clock mode and the first data path is for use during non-common clock mode and during training.

In another example embodiment, the subject matter of the first example embodiment can optionally include that a switch occurs from using the second data path to the first data path in response to receiving a predefined training set.

In another example embodiment, the subject matter of the first example embodiment can optionally include a circuit to provide the indication in response to determining the physical layer (PHY) for transferring data from the receiver to the transmitter. In another example embodiment, the subject matter of this example embodiment can optionally include that the circuit is operable to determine the PHY based on a strap option, that the circuit is operable to determine the PHY based on a sideband signal, or that the circuit is operable to determine the PHY based on a training set modification.

In another example embodiment, the subject matter of the first example embodiment can optionally include a multiplexer having a first input coupled to the first data path and a second input coupled to the second data path and an output coupled to the transmitter.

In another example embodiment, the subject matter of the first example embodiment can optionally include that the first data path further comprises one or more link training state machines for the plurality of protocols, the one or more link training state machines being used by the control circuitry to perform link training according to the one protocol specified by the indication. In another example embodiment, the subject matter of this example embodiment can optionally include that the control circuitry is operable to perform ordered set generation for link training associated with each of the plurality of protocols.

In another example embodiment, the subject matter of the first example embodiment can optionally include that the first data path further comprises: a serial to parallel (S2P) converter coupled to convert first serial data received by the receiver to first parallel data; first logic coupled to the S2P converter to perform alignment, decoding and descrambling if necessary; an elastic buffer coupled to the first logic to store data after any alignment, decoding and descrambling; staging buffer circuitry coupled to the elastic buffer and the control circuitry, the staging buffer circuitry comprising a multiplexer responsive to one or more control signals to provide data from the elastic buffer or training data to the transmitter; and parallel to serial (P2S) converter coupled and operable to receive second parallel data from the staging buffer circuitry and convert the second parallel data to second serial data.

In a second example embodiment, a method comprises receiving data with a receiver of a multi-protocol retimer, where the data has been transferred according to one of a plurality of protocols; and transmitting data between the receiver and transmitter of the retimer using a first data path coupled to the receiver and the transmitter if transfer the data received by the receiver occurs during or before protocol specific training of one or both of the transmitter and receiver via control circuitry in response to an indication of one protocol of the plurality of protocols, or a second data path coupled to the receiver and the transmitter if transfer the data received by the receiver occurs after the protocol specific training, the second data path having a lower latency than the first data path.

In another example embodiment, the subject matter of the second example embodiment can optionally include that the protocol specific training includes comprises performing an equalization process. In another example embodiment, the subject matter of this example embodiment can optionally include that performing the equalization process comprises generating transmitter equalization coefficients to control equalization performed by the transmitter.

In another example embodiment, the subject matter of the second example embodiment can optionally include that the second data path is used during common clock mode and the first data path is for use during non-common clock mode and during protocol specific training.

In another example embodiment, the subject matter of the second example embodiment can optionally include switching from use of the second data path to the first data path in response to receiving a predefined training set.

In another example embodiment, the subject matter of the second example embodiment can optionally include that providing the indication in response to determining the physical layer (PHY) type for transferring data from the receiver to the transmitter. In another example embodiment, the subject matter of this example embodiment can optionally include that determining the PHY type is based on a strap option, is based on a sideband signal, or is based on a training set modification.

In another example embodiment, the subject matter of the second example embodiment can optionally include selecting a control signal of a multiplexer having a first input coupled to the first data path and a second input coupled to the second data path to generate an output coupled to the transmitter.

In another example embodiment, the subject matter of the second example embodiment can optionally include that running a link training state machine to perform link training according to the one protocol specified by the indication. In another example embodiment, the subject matter of this example embodiment can optionally include that performing ordered set generation for the link training associated with one protocol.

In another example embodiment, the subject matter of the second example embodiment can optionally include: storing data in an elastic buffer during training; and controlling an output of a multiplexer coupled to the elastic buffer to output data, to the transmitter, from the elastic buffer or training data generated when performing the link training parallel to serial (P2S) converter coupled and operable to receive second parallel data from the staging buffer circuitry and convert the second parallel data to second serial data.

In a third example embodiment, a system comprises a pair of devices; a retimer coupled between the pair of devices to provide data flow in both directions between the pair of devices, wherein the data flow in each direction is performed by a receiver operable to receive data, a transmitter to transmit data, a first data path coupled to the receiver and the transmitter and operable to transfer data received from the receiver to the transmitter during protocol specific training, where the first data path comprises control circuitry to control protocol specific training of one or both of the transmitter and receiver in response to an indication of one protocol of the plurality of protocols, and a second data path coupled to the receiver and the transmitter, where the second data path has a lower latency than the first data path and is for use in transferring data received from the receiver to the transmitter after protocol specific training. In another example embodiment, the subject matter of this example embodiment can optionally include that the protocol specific training includes comprises performing an equalization process. In another example embodiment, the subject matter of this example embodiment can optionally include that the equalization process generates transmitter equalization coefficients to control equalization performed by the transmitter.

In another example embodiment, the subject matter of the second example embodiment can optionally include that the second data path is used during common clock mode and the first data path is for use during non-common clock mode and during training.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. An apparatus for performing retiming between first and second devices according to a plurality of protocols, the apparatus comprising:
   a receiver operable to receive data;
   a transmitter to transmit data;

a first data path coupled to the receiver and the transmitter and operable to transfer data received from the receiver to the transmitter during protocol specific training, the first data path comprising control circuitry to control protocol specific training of one or both of the transmitter and receiver in response to an indication of one protocol of the plurality of protocols; and a second data path coupled to the receiver and the transmitter, the second data path having a lower latency than the first data path and for use in transferring data received from the receiver to the transmitter after protocol specific training.

2. The apparatus defined in claim 1 wherein the protocol specific training comprises performing an equalization process.

3. The apparatus defined in claim 2 wherein the equalization process generates transmitter equalization coefficients to control equalization performed by the transmitter.

4. The apparatus defined in claim 1 wherein the second data path is used during common clock mode and the first data path is for use during non-common clock mode and during training.

5. The apparatus defined in claim 1 wherein a switch occurs from using the second data path to the first data path in response to receiving a predefined training set.

6. The apparatus defined in claim 1 further comprising a circuit to provide the indication in response to determining the physical layer (PHY) for transferring data from the receiver to the transmitter.

7. The apparatus defined in claim 6 wherein the circuit is operable to determine the PHY based on a strap option.

8. The apparatus defined in claim 6 wherein the circuit is operable to determine the PHY based on a sideband signal.

9. The apparatus defined in claim 6 wherein the circuit is operable to determine the PHY based on a training set modification.

10. The apparatus defined in claim 1 further comprising a multiplexer having a first input coupled to the first data path and a second input coupled to the second data path and an output coupled to the transmitter.

11. The apparatus defined in claim 1 wherein the first data path further comprises one or more link training state machines for the plurality of protocols, the one or more link training state machines being used by the control circuitry to perform link training according to the one protocol specified by the indication.

12. The apparatus defined in claim 11 wherein the control circuitry is operable to perform ordered set generation for link training associated with each of the plurality of protocols.

13. The apparatus defined in claim 1 wherein the first data path further comprises:
a serial to parallel (S2P) converter coupled to convert first serial data received by the receiver to first parallel data;
first logic coupled to the S2P converter to perform alignment, decoding and descrambling if necessary;
an elastic buffer coupled to the first logic to store data after any alignment, decoding and descrambling;
staging buffer circuitry coupled to the elastic buffer and the control circuitry, the staging buffer circuitry comprising a multiplexer responsive to one or more control signals to provide data from the elastic buffer or training data to the transmitter; and
parallel to serial (P2S) converter coupled and operable to receive second parallel data from the staging buffer circuitry and convert the second parallel data to second serial data.

14. A method comprising:
receiving data with a receiver of a multi-protocol retimer, where the data has been transferred according to one of a plurality of protocols; and
transmitting data between the receiver and transmitter of the retimer using
a first data path coupled to the receiver and the transmitter if transfer the data received by the receiver occurs during or before protocol specific training of one or both of the transmitter and receiver via control circuitry in response to an indication of one protocol of the plurality of protocols, or
a second data path coupled to the receiver and the transmitter if transfer the data received by the receiver occurs after the protocol specific training, the second data path having a lower latency than the first data path.

15. The method defined in claim 14 wherein the protocol specific training includes comprises performing an equalization process.

16. The method defined in claim 15 wherein performing the equalization process comprises generating transmitter equalization coefficients to control equalization performed by the transmitter.

17. The method defined in claim 14 wherein the second data path is used during common clock mode and the first data path is for use during non-common clock mode and during protocol specific training.

18. The method defined in claim 14 further comprising switching from use of the second data path to the first data path in response to receiving a predefined training set.

19. The method defined in claim 14 further comprising providing the indication in response to determining the physical layer (PHY) type for transferring data from the receiver to the transmitter.

20. The method defined in claim 19 wherein determining the PHY type is based on a strap option.

21. The method defined in claim 19 wherein determining the PHY type is based on a sideband signal.

22. The method defined in claim 19 wherein determining the PHY is based on a training set modification.

23. The method defined in claim 14 further comprising selecting a control signal of a multiplexer having a first input coupled to the first data path and a second input coupled to the second data path to generate an output coupled to the transmitter.

24. The method defined in claim 14 further comprising running a link training state machine to perform link training according to the one protocol specified by the indication.

25. The method defined in claim 24 further comprising performing ordered set generation for the link training associated with one protocol.

26. The method defined in claim 14 further comprising:
storing data in an elastic buffer during training; and
controlling an output of a multiplexer coupled to the elastic buffer to output data, to the transmitter, from the elastic buffer or training data generated when performing the link training
parallel to serial (P2S) converter coupled and operable to receive second parallel data from the staging buffer circuitry and convert the second parallel data to second serial data.

27. A system comprising:
a pair of devices;
a retimer coupled between the pair of devices to provide data flow in both directions between the pair of devices, wherein the data flow in each direction is performed by a receiver operable to receive data, a transmitter to transmit data, a first data path coupled to the receiver and the transmitter and operable to transfer data received from the receiver to the transmitter during protocol specific training, the first data path comprising control circuitry to control protocol specific training of one or both of the transmitter and receiver in response to an indication of one protocol of the plurality of protocols, and a second data path coupled to the receiver and the transmitter, the second data path having a lower latency than the first data path and for use in transferring data received from the receiver to the transmitter after protocol specific training.

28. The system defined in claim 27 wherein the protocol specific training includes comprises performing an equalization process.

29. The system defined in claim 28 wherein the equalization process generates transmitter equalization coefficients to control equalization performed by the transmitter.

30. The system defined in claim 27 wherein the second data path is used during common clock mode and the first data path is for use during non-common clock mode and during training.

* * * * *